No. 806,898. PATENTED DEC. 12, 1905.
I. F. KEPLER.
ARTIFICIAL BAIT.
APPLICATION FILED JULY 24, 1905.

Inventor,
I. F. Kepler,
by C. E. Humphrey
Atty.

UNITED STATES PATENT OFFICE.

IRWIN F. KEPLER, OF AKRON, OHIO.

ARTIFICIAL BAIT.

No. 806,898.	Specification of Letters Patent.	Patented Dec. 12, 1905.

Application filed July 24, 1905. Serial No. 271,102.

*To all whom it may concern:*

Be it known that I, IRWIN F. KEPLER, a citizen of the United States, residing at Akron, in the county of Summit and State of Ohio, have invented new and useful Improvements in Artificial Bait, of which the following is a specification.

My invention has relation to artificial bait for fishing.

The object of my invention is to provide an artificial bait capable of repeated use and which will have the properties of practically always insuring a "catch" at every "strike."

The invention aims to provide an artificial bait wherein the hooks by which the fish are snared are concealed within the body of the bait and which will spring laterally therefrom when the bait is grasped by the fish.

The invention further aims in concealing the hooks within the body of the bait during its ordinary use to prevent the hooks from being entangled with and covered by weeds and other substances which might be engaged thereby, thereby rendering the bait ineffectual for successful angling, and in doing so to provide the bait with devices for shaking off or separating the weeds so that the bait will readily pass therethrough; and the invention also contemplates incorporating in the device means for compressing in the body portion thereof spring-hooks which will upon slight and properly-directed pressure issue therefrom and catch the fish.

The invention further aims to provide means for normally compressing the spring-hooks within the body of the bait and, further, means to lock said compressing means normally in position and to so construct the same that it will be capable of releasing said spring-hooks upon a slight pressure, and thereby permit the hooks to issue from the body portion of the bait.

The invention aims in accomplishing the before-mentioned objects to provide a simple, cheap, durable, and attractive bait for anglers which will have the advantage of not readily becoming entangled with weeds by reason of the concealment of the hooks within the body portion thereof and yet will substantially always insure a ready snaring of the fish upon a strike thereby.

With the foregoing and other objects in view the invention consists of the novel construction, combination, and arrangement of parts constituting the device, to be hereinafter referred to, and illustrated in the accompanying drawings, which form a part of this specification, in which is shown the preferred embodiment of the invention; but it is to be understood that changes, variations, and modifications can be resorted to which come within the scope of the claims hereunto appended.

Figure 1:
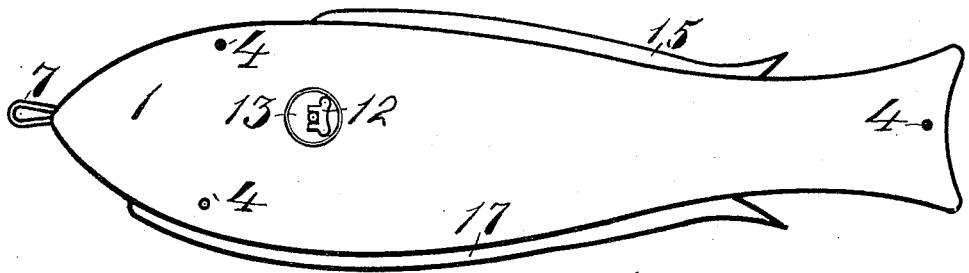
Figure 2:
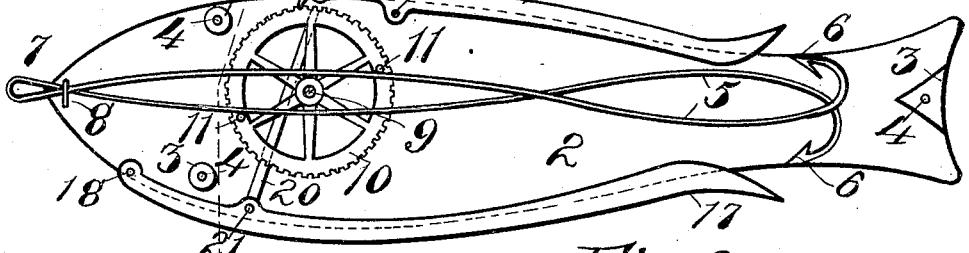
Figure 3:
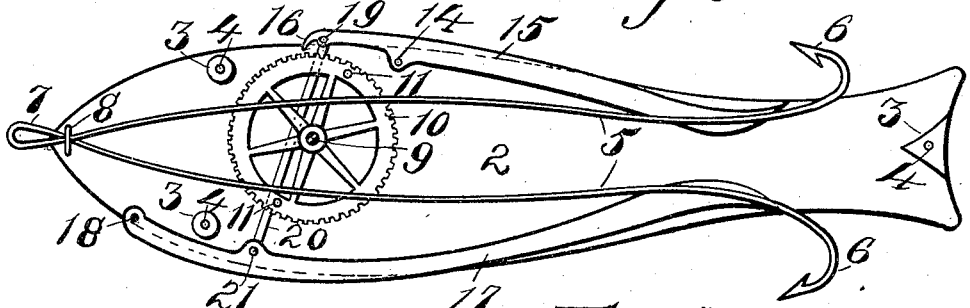
Figure 4:
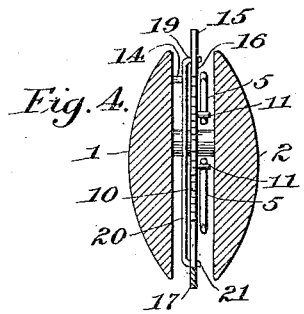

In the drawings, wherein like reference characters denote corresponding parts throughout the several views, Figure 1 is a side elevation of my improved bait; Fig. 2, a longitudinal section thereof with the hooks so placed as to be concealed within the body of the bait; Fig. 3, a similar view to Fig. 2 with the hooks extended and in a position to snare the fish, and Fig. 4 is a sectional view of Fig. 2 at the line X.

The general outlines or conformation imparted to this device will be such as to resemble a natural bait and may be in the form of a minnow, frog, worm, or other natural product used in angling.

In the drawings herein the bait is represented as resembling a minnow, shown, however, enlarged to better illustrate the mechanical details thereof, and while the mechanism is equally appropriate to other forms of bait the description herein will be confined (for the purposes of illustration) to a bait resembling in appearance a minnow or small fish.

The bait is constructed with two oppositely-disposed sides, (indicated by reference-numerals 1 and 2.) One or both of the sides 1 and 2 bear laterally-projecting lugs 3, which are adapted to abut against one another, and thereby retain the two side pieces 1 and 2 in position and spaced apart from one another to leave therebetween a longitudinal narrow opening in which the mechanism for controlling the hooks is contained. Through each one of the lugs 3 are placed rivets or pins 4, which serve to unite the two sides 1 and 2 into an integral article.

In the opening existing between the side members 1 and 2 of the bait are a pair of spring bars or rods 5, terminating at their rear ends in barbed hooks 6 and preferably united into a looped portion 7 at their front end. This looped portion is designed to extend forward beyond the normal outlines of the entire bait and serve as a means for attaching a swivel, leader, or line by which the bait is manipulated in angling. In forming the looped portion 7 the portions of the bars 5 will preferably cross each other immediately within the front outlines of the bait and be held in position by a loop or staple 8, attached to one of the side members 1 or 2.

The general conformation of the spring-bars 5 is such that when compressed sufficiently to bring the hooked ends 6 within the outlines of the body of the bait they will cross each other near the central portion of the bait, as shown in Fig. 2, and when extended, as shown in Fig. 3, will normally spread apart, so as to extend the hooked ends 6 laterally sufficiently to snare a fish.

The mechanism whereby the bars 5 are confined within the outlines of the body portion of the bait, as shown in Fig. 2, is as follows: Extending between the side members 1 and 2 and the space intervening therebetween is a rotatable shaft 9, which bears between the members 1 and 2 a toothed wheel 10, tightly fastened on the shaft 9 and adapted to revolve in connection therewith. The wheel bears near its outer periphery laterally-extending pins 11, so placed with respect to the spring-bars 5 that when the wheel 10 is rotated in either direction each pin 11 will bear against a respective member of the pair of bars 5 and compress these two bars 5 toward one another sufficiently to bring the hooked ends 6 within the normal outlines of the body of the bait.

On the outside of one of the body members 1 or 2 of the bait and attached to the shaft 9 is pivoted a thumb-nut 12, which when raised to a vertical position can easily be grasped by the fingers for rotating the shaft 9 and wheel 10 and when not so employed may be folded downwardly, as shown in Fig. 1, and be concealed within the outlines of a pocket or depression 13, existing in the body member of the bait.

Pivoted on a pin 14, attached to one of the members 1 or 2, is a fin-shaped blade 15, having its rear end shaped to resemble the fin of a fish and its front end provided with a downwardly-turned finger 16, capable of engaging the teeth of the wheel 10.

In the space existing between the two members 1 and 2 and at the bottom portion of the body thereof is a fin-shaped blade 17, pivoted to one of the members 1 or 2 by a pin 18 and arranged to lie approximately parallel and oppositely disposed with respect to the position of the blade 15. The front end of the blade 15 bears a pin 19, to which is connected a bar 20, the opposite end of which is pivotally attached to a pin 21 on the blade 17.

It will be stated before going into a detailed description of the operation of this device that the space existing between the body members 1 and 2 of the device is such as to permit the free operation of the wheel 10 and blades 15 and 17 without in any way interfering with the outward springing of the spring-bars 5, which bear the hooks 6.

Assuming that the members are in the position shown in Figs. 1 and 2 and the bait in use properly attached to a line, a fish attacking or attracted by the bait will in its endeavor to swallow the same press on either or both of the blades 15 and 17, from which the following operation takes place: If pressure is exerted on the rear end of the blade 15 it will depress the same into the space existing between the body members 1 and 2, and thereby raise the forward end of the blade 15 and release the finger 16 from engagement with the toothed wheel 10. This releasing of the finger 16 from engagement with the toothed wheel 10 will permit the spring-bars 5 to spring outwardly, as shown in Fig. 3, and thereby carry their hooked ends 6 sufficiently far laterally to engage the mouth or throat of the fish. It will be remembered in connection with this description that the bars 5 have a normal tendency (unless restrained) to assume the position shown in Fig. 3, and in compressing the same in the position shown in Fig. 2 a considerable tension must be exerted thereon by means of the revolution of the pins 11 on the toothed wheel 10. If for any reason the fish in its effort to grasp the bait presses inwardly the rear end of the blade 17, the connecting-rod 20, which is attached to the blade 15 near its front end, will raise the finger 16 from engagement with the toothed wheel 10, and the same operation will take place as if the blade 15 was engaged directly by the fish.

It will be noted that in using the bait it will be set in the position indicated in Figs. 1 and 2, wherein the hooked ends 6 of the bars 5 are within the outlines of the body of the bait, and hence cannot engage and become entangled with weeds and other substances which might render ineffectual the use of this device, and it will be further noted that if the bait is pulled through a mass of weeds in its course through the water the weeds will press upon the forward portions only of the blades 15 and 17, and hence will not exert a pressure upon those portions of the blades which are capable of releasing the bars 5. It will be further obvious that the portions of the blades 15 and 17 which are capable (when pressed upon) of releasing the hooked mechanism are inwardly curved, and hence would freely pass through an opening in the weeds made by the forward portions of the bait.

In passing through a mass of weeds or other similar substances which might exert a pressure thereupon the rounded front portion of the bait will force an opening therein and the weeds or similar substances will encounter the blade 15 primarily at the point where the curved finger 16 exists and serve rather to increase the engagement of this finger 16 with the wheel 10 instead of tending to release the same, and the weeds encountering the lower portions of the bait will come in contact with the blade 17 so near its pivot 18 that ordinarily the blade 17 will not be pressed sufficiently to release the finger 16 from engagement with the toothed wheel 10.

What I claim, and desire to secure by Letters Patent, is—

1. A device of the class described comprising two body members united together and spaced apart forming an opening between said members, a looped spring-bar provided with hooked ends the normal tendency of which is to force the hooked ends from said opening, suitably mounted in said opening, means to confine said hooks within the outlines of said opening, and releasing mechanism for releasing said confining means.

2. A device of the class described comprising two body members united together and spaced apart forming an opening between said members, a looped spring-bar in said opening the looped portion thereof arranged to project from said opening to constitute means for attaching said device to a supporting medium, said bar being provided with hooked ends the normal tendency of said ends being to project from said opening, means in said opening to confine the bar within said opening and means to release said confining means.

3. A device of the class described comprising two oppositely-disposed body portions united together and spaced apart forming an opening between said members, a looped spring-bar mounted in said opening provided with hooked ends the normal tendency of said ends being to project from said opening, a toothed wheel in said opening, means on said toothed wheel to engage portions of said bar and compress the same, whereby the hooked ends thereof are confined within the opening in said device, and a blade pivoted in said device arranged to engage said toothed wheel and lock the same against rotation.

4. An artificial bait comprising a body portion, a plurality of spring-hooks suitably located in said body portion and arranged to spring therefrom, a revoluble toothed wheel in said body portion, means on said wheel to operatively engage said spring-hooks, whereby said spring-hooks are normally held within the outlines of said body portion, and means to lock said toothed wheel against revolution.

In testimony whereof I have hereunto set my hand in presence of two subscribing witnesses.

IRWIN F. KEPLER.

Witnesses:
GLENARA FOX,
C. E. HUMPHREY.